(12) United States Patent
Hess et al.

(10) Patent No.: US 7,916,039 B2
(45) Date of Patent: Mar. 29, 2011

(54) SYSTEM FOR CONVEYING AUDIO INFORMATION WITH A SPATIAL CHARACTERISTIC TO A VEHICLE OCCUPANT

(75) Inventors: Wolfgang Hess, Karlsbad (DE); Tobias Münch, Straubenhardt (DE); Hans-Jürgen Nitzpon, Ettlingen (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 336 days.

(21) Appl. No.: 12/168,345

(22) Filed: Jul. 7, 2008

(65) Prior Publication Data

US 2009/0146840 A1    Jun. 11, 2009

(30) Foreign Application Priority Data

Jul. 4, 2007   (EP) .................................. 07013066

(51) Int. Cl.
    *G08B 7/00*    (2006.01)
(52) U.S. Cl. .................... 340/691.1; 340/438; 340/435; 340/384.7
(58) Field of Classification Search .................. 340/459, 340/463, 464, 426.24, 903, 438, 435, 486, 340/384.1, 691.1, 691.3
    See application file for complete search history.

(56) References Cited

U.S. PATENT DOCUMENTS

| | | | |
|---|---|---|---|
| 5,979,586 A | 11/1999 | Farmer et al. | |
| 6,087,961 A | 7/2000 | Markow | |
| 7,245,231 B2 * | 7/2007 | Kiefer et al. | 340/903 |
| 7,649,444 B1 * | 1/2010 | Fear et al. | 340/438 |
| 2003/0108212 A1 | 6/2003 | Yun | |
| 2003/0141967 A1 | 7/2003 | Aichi et al. | |
| 2004/0178893 A1 | 9/2004 | Litkouhi et al. | |
| 2006/0001532 A1 | 1/2006 | Nagata | |

* cited by examiner

*Primary Examiner* — Jeffery Hofsass
(74) *Attorney, Agent, or Firm* — The Eclipse Group LLP

(57) ABSTRACT

A system is provided for conveying information to an occupant of a motor vehicle. In one example of an implementation, driving-relevant information is obtained for example using sensors or a navigation system. An audio message is determined based on the obtained driving-relevant information. Spatial characteristics for the audio message are also determined. The audio message is output in the motor vehicle with the determined spatial characteristic via loudspeakers.

30 Claims, 3 Drawing Sheets

SYSTEM FOR CONVEYING AUDIO INFORMATION WITH A SPATIAL CHARACTERISTIC TO A VEHICLE OCCUPANT

RELATED APPLICATIONS

This application claims priority of European Patent Application Serial Number 07 013 066.1, filed on Jul. 4, 2007, titled METHOD AND APPARATUS FOR CONVEYING INFORMATION TO AN OCCUPANT OF A MOTOR VEHICLE, which application is incorporated in its entirety by reference in this application.

BACKGROUND OF THE INVENTION

1. Field of the Invention

This invention relates to a system for conveying information to an occupant of a motor vehicle. In particular, such system may be a method or apparatus may employed in the context of a driver assistance system.

2. Related Art

Motor vehicles like cars, trucks and the like increasingly use driver assistance systems to assist a driver in driving the motor vehicle. In the following description, a vehicle equipped with a driver assistance system will be referred to as an "equipped vehicle".

An example for such a driver assistance system is a parking assistance system that includes sensors for measuring a distance to obstacles like other vehicles behind the equipped vehicle and that emits warning signals corresponding to the measured distance. Such warning signals are known, as an example, to be a tone, where frequency of the warning tone increases with decreasing distance.

Navigations systems are another example of the driver assistance system. In this example, the navigation systems, using GPS (Global Positioning System), determine the position of the equipped vehicle and inform the driver of the route to be taken to a desired destination.

Yet other examples of driver assistance systems monitor traffic surrounding the equipped vehicle and inform the driver of dangerous situations, for example, an impending collision or a distance to another vehicle below a predetermined safety distance. This informing of the driver may be done acoustically by warning signals and the like, optically using displays or by a combination of the acoustic and optical signals.

In all of the above described examples, some driving-relevant information, be it a route to be taken, a distance to an obstacle or information regarding an impending collision, is obtained, and based on the obtained driving-relevant information, an audio message, a visual message and/or a tactile message is conveyed to the driver.

When conveying such information, it is generally desirable that the significance of the information can be understood by the driver of the equipped vehicle as quickly and intuitively as possible such that the distraction of the driver is minimized and quick reaction times, especially in the case of warnings of dangerous situations, become possible. In this respect, it is for example not desirable that after hearing a warning signal the driver additionally has to consult a display to obtain more information before the driver can respond to the dangerous situation.

Therefore, a need exists for a system for conveying information to an occupant of a motor vehicle that provides for improved reception of the information by the occupant. A further need exists for a system that conveys such information through auditory presentation, which enables a fast reaction time, since auditory information is intuitively processed by cognition, whereas visual information presentation forces the recipient to identify and interpret information.

SUMMARY

According to one example of an implementation of the invention, a method for conveying information to an occupant of a motor vehicle is provided. The method includes the steps of obtaining driving-relevant information, determining an audio message depending on the obtained driving-relevant information, determining a spatial characteristic for the audio message depending on either the driving-relevant information or the selected audio message and outputting the audio message with the spatial characteristic in the motor vehicle.

The driving-relevant information may include information regarding traffic, such as traffic jams on the road, regarding other vehicles, for example approaching emergency vehicles or vehicles with which a collision may occur when no action is taken such as overtaking maneuvers, regarding other kinds of obstacles or the like. The spatial characteristic may include parameters like distance, direction or movement, where the distance, direction and/or movement, respectively, of an obstacle (such as another vehicle) may be determined relative to the motor vehicle. In other words, the audio message is output in a way to give the occupant the impression of hearing the audio message from a specific distance, from a specific direction and/or with a specific movement according to the determined spatial characteristic. To achieve this, techniques like convolving the audio message with so-called room impulse responses and/or crosstalk cancellation may be utilized.

In one example, the audio message may be output in the motor vehicle without using any visual display. In another implementation, a visual and/or tactile display may be additionally provided to convey additional visual information regarding the obtained driving-relevant information.

According to another example of an implementation, a system for conveying information to an occupant of a motor vehicle is provided. The system includes components for obtaining driving-relevant information such as sensor, a global positioning system (GPS) and a processor. The system further includes components, such as an audio selector and a memory, for determining an audio message depending on the driving-relevant information. A convolution engine or other similar component is also provided for determining spatial characteristics for the audio message, based upon either the driving-relevant information or the determined audio message. Further components, such as loudspeakers, are provided for outputting the audio message in the motor vehicle in accordance with the determined spatial characteristics.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
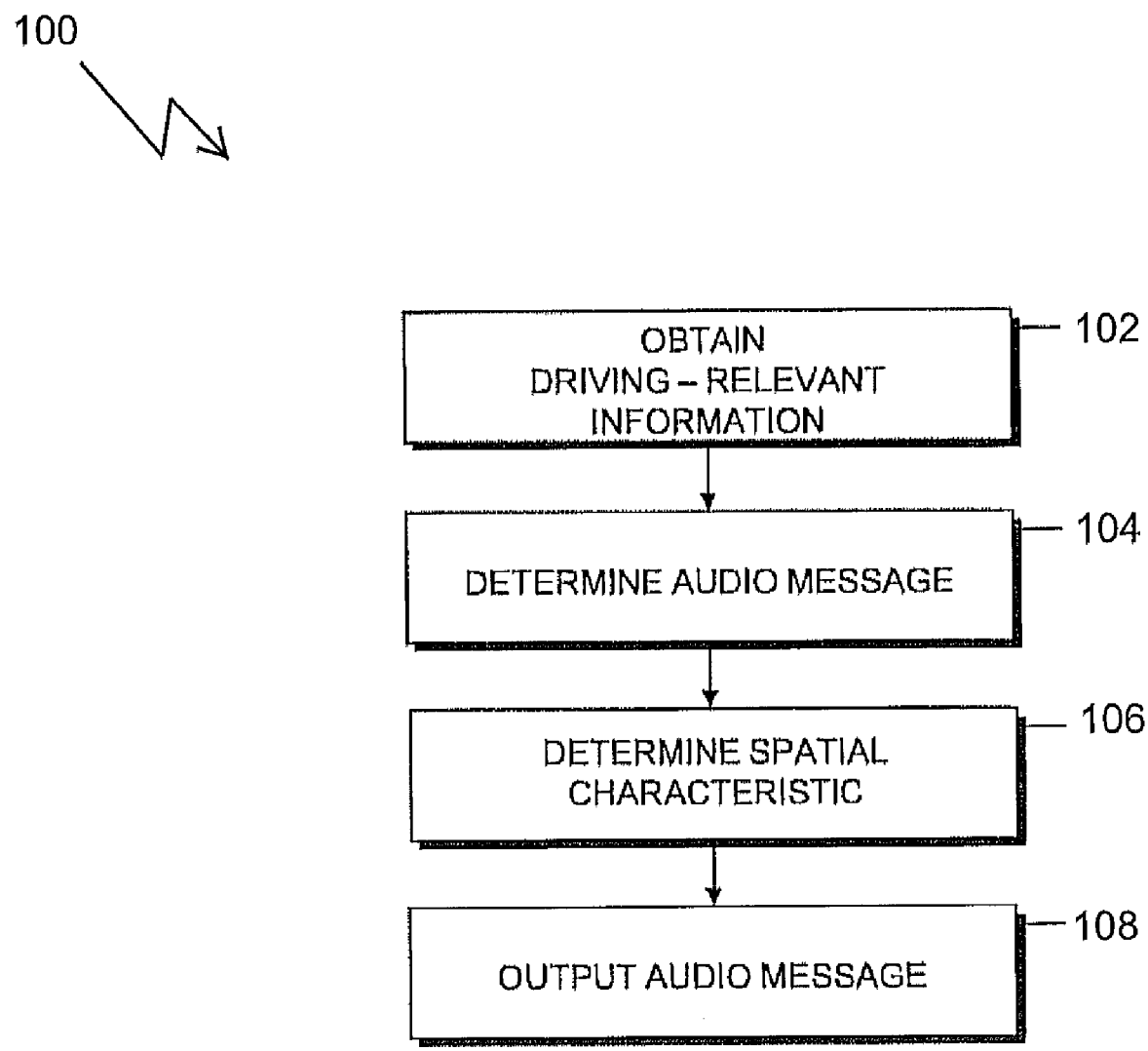
FIG. 1 is a flow diagram showing one example of one implementation of a method for conveying information to a vehicle occupant.

FIG. 1 is a flow diagram showing one example of one implementation of a method 100 for conveying information to a vehicle occupant. As illustrated in FIG. 1, relevant driving information is first obtained at step 102. Based upon the obtained relevant driving information at step 102, a corresponding audio message is selected at step 104 for conveying to the vehicle occupant. Although step 104 describes the message as an audio message, it may include a visual message, a tactile message or a combination of an audio, visual and/or tactile message conveyed to the vehicle occupant.

In one example, the type of audio message in the embodiment shown depends on the driving-relevant information obtained. The audio message may be spoken text, signals, music, sounds, like the sound of a siren and/or sounds of a braking vehicle and other like sounds. For example, the audio message may be spoken text related to the situation, such as an announcement of a distance of another vehicle or a traffic jam (e.g., "traffic jam" or "traffic jam 5 km ahead").

The audio message may also be simple signals like beeps. Other possible types of audio messages are traffic sounds like braking noises, which for example may be used in dangerous situations, i.e., when a collision with another vehicle is likely to occur. Also, music may be used as an audio message, where the type of music may be adapted to the traffic-relevant information (music with sub-bass, calming music, exciting music and the like). Also, in case the driving -relevant information is, for example, the information that an emergency vehicle approaches, the audio message may be the sound of a siren. The audio message may also include more than one of the above types of messages, e.g. spoken text combined with music.

In additional to selecting the message type, the system of the invention, in accordance with the described method 100, also determines the spatial characteristic of the message at step 106, based upon either or both the obtained relevant driving information or the selected message. Once the spatial characteristics are determined, the message is then output to the vehicle occupant at step 108 based upon the determined spatial characteristic of the message.

In the illustrated example, a spatial characteristic is determined depending on the driving-relevant information obtained in step 102. In an alternative implementation, the spatial characteristic may also be determined based upon the determined audio message. Spatial characteristic relates to a desired spatial hearing impression that an occupant of the equipped vehicle has when he hears the audio message determined in step 104. In the illustrated implementation, the spatial characteristic includes direction characteristics, distance characteristics and/or movement characteristics. In other words, according to the spatial characteristic determined in step 106, an occupant of the equipped vehicle should hear the audio message from a specific direction, from a specific distance and/or with a specific movement as determined by the spatial characteristic. As illustrated in step 108, the audio message is then output with the determined spatial characteristic. Examples of outputting the audio message with the determined spatial characteristic are described below.

As a first example, if the driving-relevant information obtained in step 102 corresponds to the one of a parking assistance system, i.e., includes information regarding distance and direction of an obstacle behind the equipped vehicle, the spatial characteristic may include the distance and direction such that the audio message output with this spatial characteristic makes the impression to an occupant as if coming from the direction and being in the distance. The audio message itself case may comprise a simple "beep" signal, but also may comprise a text announcing the distance of the obstacle, for example "one meter left". As the equipped vehicle approaches the obstacle in a parking maneuver, the distance of the spatial characteristic decreases, and also the direction may change so that the audio message heard by the occupant is perceived as moving.

In this regard, if the audio message informs the occupant of a stationary obstacle (for example an obstacle in front), a slight movement in the audio may be introduced in through spatial characteristics, i.e., a slight variation of the direction. Such slight movements may reduce the probability of so-called front to back confusion, i.e., confusion between an audio message reproduced as coming from the front with an audio message coming from the rear of the occupant.

In a second example, the driving-relevant information includes information regarding an approaching emergency vehicle, like a police car, an ambulance or a fire engine. In this case, the spatial characteristic, similar to the one described above for the parking assistance system, may include direction, distance and movement of the emergency vehicle. Accordingly, a siren sound, either a siren stored in a memory, like memory 212 of FIG. 2, or a siren sound extracted from the driving-relevant information, for example, captured by microphones, may be output in step 108 such that the occupant hears the siren from the corresponding direction and in the corresponding distance. Thus, an at least approximately realistic impression of the approaching emergency vehicle may be conveyed to an occupant of the equipped vehicle even if the acoustic insulation of the vehicle and/or the volume of internal sound system is such that the approaching emergency vehicle could hardly be heard otherwise.

Figure 2:
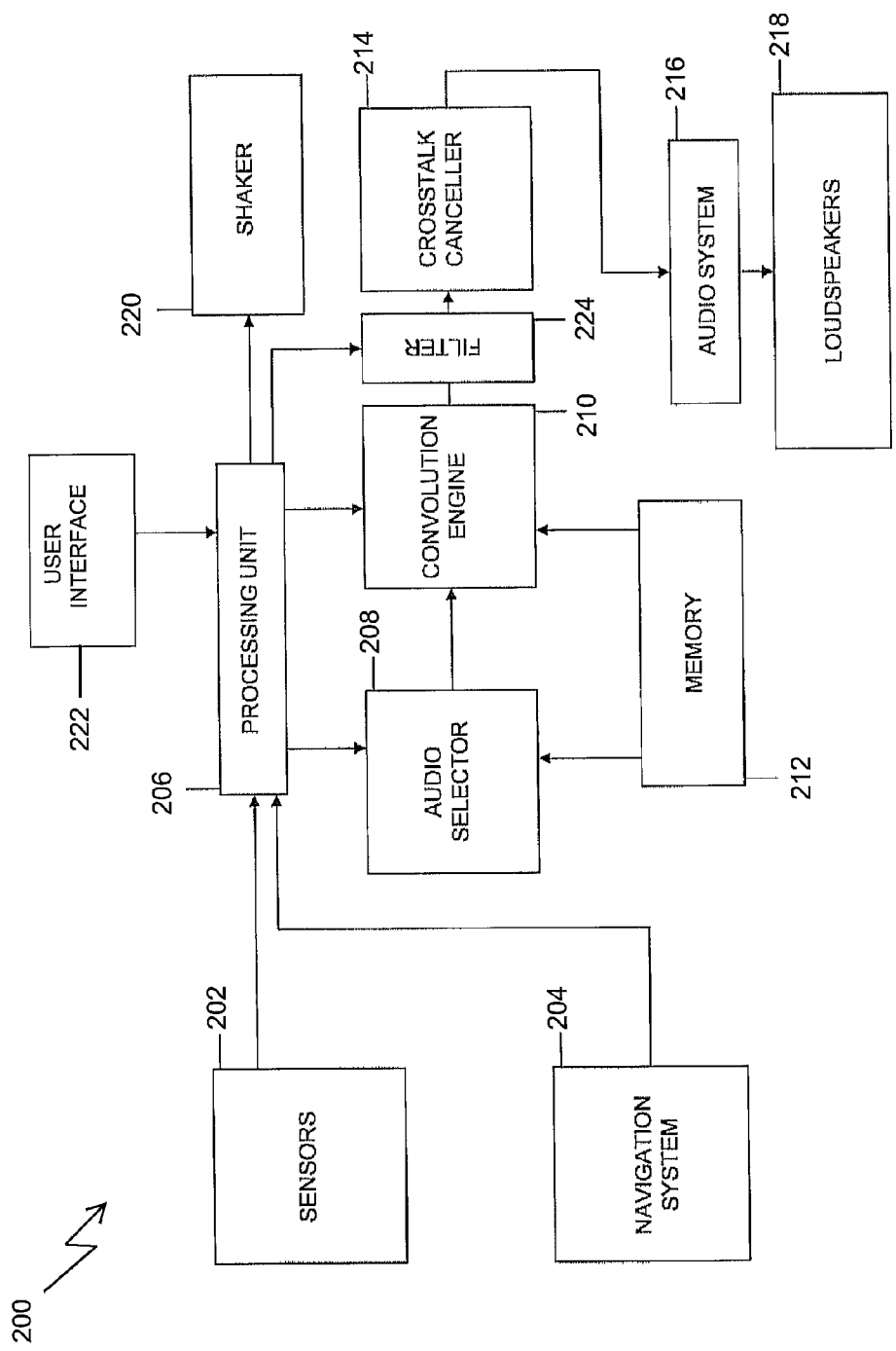
FIG. 2 is a block diagram of one example of one implementation of system for conveying information to a vehicle occupant.

As a third example, the driving-relevant information includes traffic information regarding traffic jams or accidents, for example supplied by a navigation system 204 of FIG. 2. In this case, the audio message may include corresponding text, for example "traffic jam 5 km ahead", and the spatial characteristic is chosen such that this audio message is heard in front of an occupant with a distance corresponding to the distance of the traffic jams, i.e., traffic jams further ahead on the road are heard as being announced from a greater distance than traffic jams closer to the actual position of the vehicle.

In a fourth example, the driving-relevant information obtained in step 102 includes information regarding other vehicles than the equipped vehicle presenting a potential danger, for example an overtaking vehicle in the blind area of the driver. In this case, the spatial characteristic is determined such that the audio message is heard as coming from the direction of the overtaking vehicle.

In a fifth example, the audio message may be a text, for example "attention vehicle overtaking", or a sound corresponding to the sound of a vehicle. The audio message may also be chosen depending on the danger of the situation. For example, a normal overtaking maneuver may simply be announced as explained above, while an abrupt braking vehicle in front of the equipped vehicle may be announced with additional warning sounds, the sound of a braking vehicle and the like.

FIG. 2 is a block diagram of one example of one implementation of system 200 for conveying information to a vehicle occupant. The system 200 shown in FIG. 2 is adapted to be installed in a motor vehicle like a car, a truck or the like. In the illustrated example, the system 200 is equipped with sensors 202 for detecting other vehicles, obstacles, pedestrians and the like in the surroundings of the motor vehicle. The sensors 202 may, for example, be infrared sensors, radar sensors, optical sensors, and/or acoustical sensors (i.e., microphones). Such sensors 202 may be mounted in bumpers of the equipped vehicles, along the sides of the equipped vehicle and/or in the interior of the equipped vehicle, in addition to other locations in the interior, or along the exterior, of the vehicle.

As illustrated in FIG. 2, sensors 202 are coupled to a processing unit 206 for processing signals received from the sensors 202 and deriving driving-relevant information, for example, information regarding an impending collision or information regarding the position of obstacles and other vehicles. It should be noted that such sensors 202 and processing units 206 as described so far are also employed in conventional driver assistance systems and therefore, need not be described here again in detail. In general, any conventional apparatus or method for obtaining such driving-relevant information may be utilized in connection with the described invention. For purposes of this application, a vehicle equipped with any mechanism capable of obtaining driving-relevant information, such as sensors or other type of driver assistance system, will be referred to as an "equipped vehicle".

In addition, the example system 200 illustrated in FIG. 2 includes a navigation system 204, also coupled to the processing unit 206. Navigation system 204 may provide information regarding the position of the equipped vehicle, information regarding traffic, for example traffic jams, in particular by using a traffic message channel (TMC) and/or information regarding a route to be taken to processing unit 206. This information is also used for obtaining driving-relevant information, for example information regarding a traffic jam on the route the equipped vehicle is using. The sensors 202, navigation system 204 and the above-described functions of the processing unit 206 may all be utilized to obtain relevant-driving information, as described in step 102 of the method illustrated in FIG. 1.

The system 200 illustrated in FIG. 2 further includes an audio selector 208 and memory 212. The audio message determined depending on the driving-relevant information in step 104 of the method of FIG. 1 may be selected utilizing the processing unit 206, which, as illustrated in FIG. 2, is coupled to an audio selector 208. The audio selector 208 may then be utilized to select an appropriate audio message stored in a memory 212. In case the sensors 202 include microphones or other devices for detecting sounds, the audio message, instead of being selected from memory 212, may also be directly derived from the sound signals produced by the microphones.

In the example system 200 of FIG. 2, the spatial characteristic is determined by processing unit 206. To produce signals giving the desired hearing impression to an occupant of the equipped vehicle according to the determined spatial characteristic, the audio message selected by audio selector 208 is fed to a convolution engine 210 performing a low latency block convolution/filtering with so-called room impulse responses (RIR). In the illustrated implementation, the room impulse responses are static, non-individualized room impulse responses which are stored in memory 212. For purposes of the this application, "non-individualized" refers to the fact that the room impulse responses are not measured for an individual human being who later hears the audio message, for example the driver, but represent RIRs determined beforehand independently of the individual occupant. Static means that room impulse responses are measured for a plurality of points in space, and the spatial characteristic is produced by using the point or points in space which best match the desired spatial characteristic.

Convolution engine 210 performs a convolution of the audio message with a room impulse response read from memory 212 according to the determined spatial characteristic. This convolution is performed for each sound reproducing channel, for examples, each loudspeaker 218 utilized to output the audio message.

The convolution of the audio message with the room impulse response constitutes a filtering of the audio message. With this filtering, e.g., the distance of the spatial characteristic mentioned above may be adjusted by varying loudness, spectral properties, for example by simulating absorption by air, or addition of reflection and reverberation. The direction may be changed by changing delays and signal levels in the sound reproducing channels. These techniques are generally known from stereo or multichannel sound reproducing or binaural technology.

With the technique described above, the spatial resolution of the system is determined by the number of room impulse responses stored in memory 212. Preferably, the resolution is greater for distances near the occupant, for example the driver, of the equipped vehicle than farther away. This will be further illustrated with reference to FIG. 3.

As further illustrated in FIG. 2, the output of convolution engine 210 is fed to a filter 224 that is also controlled by processing unit 206. Downstream of filter 224, a crosstalk canceller 214, which allows symmetric or unsymmetric crosstalk cancellation, is provided. Crosstalk canceller 214 serves for canceling crosstalk. Since in the motor vehicle the audio message ultimately is output by a loudspeaker system, in general, each ear of an occupant hears the sounds output by each loudspeaker. However, to make sure that each ear only hears the sounds intended for it to produce the desired spatial characteristic and spatial shift of auditory objects can be presented, a crosstalk-canceller 214 is utilized. Also, crosstalk-canceller 214 adds cancellation signals that eliminate or compensate signals not intended for an ear. This technique is also known from the field of 3D and binaural audio rendering techniques.

The signals output by crosstalk-canceller 214 are fed to an audio system 216 which amplifies the sounds and feeds to them to loudspeakers 118. It should be noted that even with a single pair of loudspeakers, some spatial impression may be realized. Preferably, however, two pairs of loudspeakers, one pair in the front of the equipped vehicle and one pair in the rear of the equipped vehicle, or three pairs of loudspeakers with an additional pair in the middle section of the equipped vehicle is utilized. Other arrangements are also possible in other implementations.

The audio system 216 and loudspeakers 218 may be dedicated components for utilization in the system 200. It is also possible that audio system 216 and loudspeakers 218 correspond to a sound system which is utilized for other purposes as well, for example for hearing music, and the system 200 of FIG. 2 provides an interface to this audio system 216.

The system 200 according to the implementation illustrated in FIG. 2 embodiment additionally includes a shaker 220. A shaker 220 is a device installed in a seat to cause vibrations. The shaker 220 may be activated by processing unit 206, in particular, in dangerous situations, for example, the already mentioned abrupt braking of a vehicle in front of the equipped vehicle, to additionally get the driver's attention. Shaker 220 is merely an example for additional means besides the audio message output via loudspeakers 218 to convey information to an occupant of the vehicle, and besides shaker 220 other tactile means or visual displays may be additionally provided. While a visual display is not necessary, a visual display may be utilized to convey information to a driver without using visual displays. The shaker 220 or similar means may also be utilized in other dangerous situations, for example, a motorist driving against the traffic on a highway, an approaching emergency vehicle and or similar serious situation. In one implementation, when the driving-relevant information is classified as an emergency, additional means for alerting an occupant, in particular a driver, like tactile means, e.g. a shaker causing vibrations in a seat of the equipped motor vehicle, may be activated.

Processing unit 206 may further include a user interface 222 in communication with the processing unit 206. With the user interface 222, a user, for example a driver of the equipped vehicle, can adjust the system 200 as desired. For example, audio messages for specific driving -relevant information may be chosen. For instance, the user may choose whether a parking assistance system uses "beep"-signals or spoken text. Furthermore, regarding driving -relevant information relating to potential dangers, a user may select a threshold value at which the system is activated. Such a threshold value may, for example, be a value of a distance to another vehicle representing a potential danger, a relative velocity of such a further vehicle or other obstacles and the like. Furthermore, the user may activate or deactivate certain features of the system 200 like the announcement of traffic information, collision warnings, parking assist and the like.

In general, step 102 of obtaining driving-relevant information of the method of FIG. 1 may be carried out by a sensing mechanism. Such sensing mechanism, as illustrated in the system 200 in FIG. 2, may include sensors like optical sensors, infrared sensors, radar sensors, and/or acoustical sensors for determining distances, directions and/or a speed of obstacles or other vehicles around a vehicle equipped with the apparatus according to the second aspect. The sensing mechanism may also include a navigation system for obtaining information regarding the position of the motor vehicle or to obtain traffic information. The sensing mechanism additionally, or alternatively, may also comprise a processing unit and/or an interface for connecting to devices, such as sensors, navigation systems or the like.

The step 104 of determining an audio message of the method of FIG. 1 may be carried out by a message selecting mechanism. Such message selecting mechanism, as illustrated in the system 200 in FIG. 2, may include a processor, an audio selector and/or memory in which a plurality of different audio messages are stored. In this case, an audio message may be selected from the memory depending on the driving-relevant information.

The step 106 of determining a spatial characteristic of the method of FIG. 1 may be carried out by a spatial characteristic selecting mechanism. Such spatial characteristic selecting mechanism, as illustrated in the system 200 in FIG. 2, may include a convolution engine and/or a crosstalk-canceller to generate audio signals which, when output via loudspeakers or the like, have the desired spatial characteristic. In this respect, the output device, for outputting the audio message in step 108 of the method of FIG. 1, may include an interface to an audio system (radio system, CD system and the like) of the vehicle, may be combined with such an audio system, or may include its own sound generation system like amplifiers, loudspeakers and the like.

Figure 3:
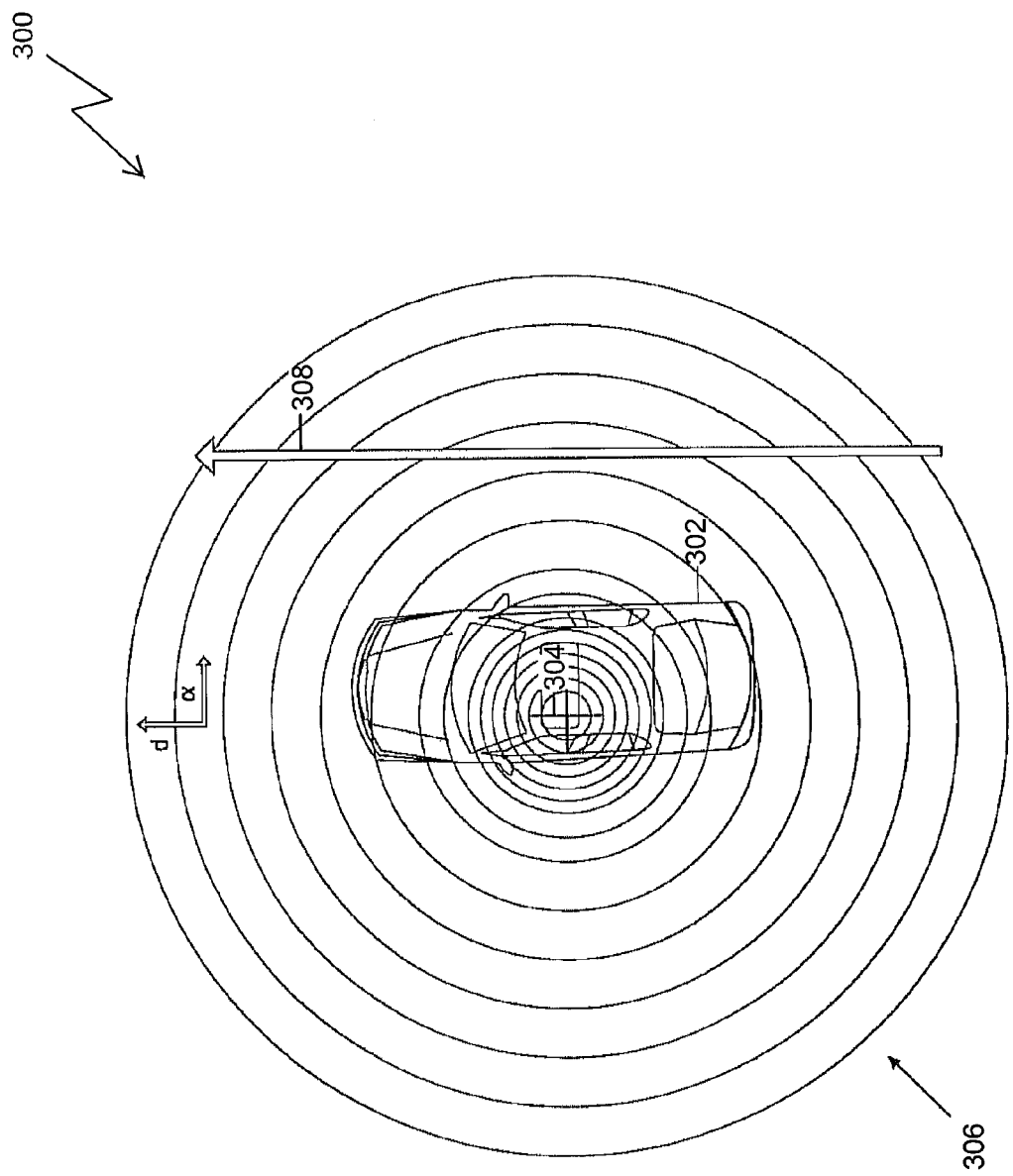
FIG. 3 is an explanatory diagram for explaining examples of features of the information conveying system of the invention.

FIG. 3 shows, as an example, for the equipped vehicle, a car 302, where the position of the driver is marked with a cross 304. Circles 306 around the position of the driver 304 indicate the distances d for which room impulse responses are stored in memory 212 of FIG. 2. As can be seen, the spacing between the circles is smaller closer to the position of the driver 304 than farther away from the driver 304 representing a higher resolution close to the driver 304.

Room impulse responses are stored for different directions as represented by an azimuth angle $\alpha$. The directional spacing, i.e., the azimuth angles between two adjacent room impulse responses, may also be smaller for distances closer to the position of the driver than for distances farther away from the driver.

With such room impulse responses, an "audio path" as represented by an arrow 308 may be produced that gives the impression of a moving source of the audio message. In case of arrow 308, room impulse responses corresponding to the points where arrow 308 crosses circle 306 are utilized, where for each crossing point the room impulse response on the same circle, i.e., for the same distance, closest to the crossing point is utilized in the example. For giving the impression of movement, the room impulse response as utilized in convolution engine 210 is then switched at appropriate time intervals. This corresponds to a switching of RIR filters. To give a better impression of a continuous movement in illustrated example, a fading of the room impulse responses is utilized.

Further, with a filter 224 for a path like the one represented by arrow 308 of FIG. 3, a frequency shift may be introduced to the signal for simulating the Doppler effect. This may enhance the impression of a moving sound source. In other implementations, filter 224 may be integrated in convolution engine 210 or be absent.

It is also possible to store a sequence of room impulse responses for a number of predetermined movement paths like the one represented by arrow 308 in FIG. 3 and then retrieve the sequence as spatial characteristic. With reference to FIG. 3, a spatial resolution in two dimensions has been discussed. In other implementations, the direction of the spatial characteristic may be three-dimensional, such that audio messages may also be output via loudspeakers such that the occupant of the equipped vehicle has the impression that the sound source is above or below the vehicle.

Furthermore, while the generation of audio signals with spatial characteristics utilizing room impulse responses has been described in detail, other techniques known in the art may also be used for generating such audio signals.

It should be noted that the above-discussed embodiments merely serve as examples as many variations are possible. For example, while the illustrated implementations have been described as being able to deal with a plurality of different driving-relevant information, such as approaching emergency vehicles, obstacles, potentially dangerous other vehicles, traffic information and the like, other implementations may be limited to only some or only one of these types of information. Furthermore, regarding the system illustrated in FIG. 2, while distinct elements are shown having distinct functions, elements may also be combined. For example, filter 224 may be integrated in convolution engine 210 and/or integrated with processing unit 206 or audio selector 208. On the other hand, while a single memory 212 is shown for storing audio messages and room impulse responses, separate memories may also be provided, as well as separate processing units 206.

Further, as already mentioned, audio system 216 and loudspeakers 218 may be an integral part of the system 200, but, also in other implementations, only an interface to an existing audio system may be provided. The same holds true for sensors 202 and/or navigation system 204. In other words, various implementations of the invention may not have integrated sensors 202, but may provide an interface to one or more existing sensors 202 in the vehicle.

It will be understood, and is appreciated by persons skilled in the art, that one or more processes, sub-processes, or process steps described in connection with FIGS. 1-2 may be performed by hardware and/or software. If the process is performed by software, the software may reside in software memory (not shown) in a suitable electronic processing component or system such as, one or more of the functional components or modules schematically depicted in FIGS. 1 & 2. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for conveying information to an occupant of a motor vehicle, comprising:
   obtaining driving-relevant information;
   determining an audio message depending on the obtained driving-relevant information;
   determining a spatial characteristic for the audio message depending on either the obtained driving-relevant information or the determined audio message;
   selecting at least one stored room impulse response depending on the spatial characteristic;
   convolving the room impulse response with the audio message; and
   outputting the audio message with the spatial characteristic in the motor vehicle.

2. The method of claim 1 where the driving-relevant information includes at least type of information chosen from the group consisting of traffic, dangerous driving situations, other vehicles, emergency vehicles and obstacles.

3. The method of claim 1 where the audio message includes at least one message chosen from the group consisting of spoken text, signals, music, traffic sounds and siren sounds.

4. The method of claim 1 where the spatial characteristic include at least one element from the group consisting of a distance, a direction and a movement.

5. The method of claim 1 where the spatial characteristic corresponds to a position of a relevant element of the driving-relevant information.

6. The method of claim 5 where the relevant element is chosen from the group consisting of a vehicle, an obstacle, a traffic jam and an accident.

7. The method of claim 5 where the relevant element is stationary and the spatial characteristic include movement to decrease the likelihood of front-back confusion.

8. The method of claim 1 where the convolution is performed for a plurality of sound producing channels utilized to output the audio message.

9. The method of claim 1 where the at least one room impulse response is selected from a plurality of stored room impulse responses for a plurality of positions relative to the position of the occupant and where a density of the positions is higher closer to the occupant than farther away from the occupant.

10. The method of claim 1 where the spatial characteristic includes a movement, the at least one room impulse response includes a series of room impulse responses approximating a series of locations of the movement and the convolving step includes sequentially convolving the series of room impulse responses with the audio message.

11. The method of claim 10 further including fading between adjacent room impulse responses of the series of room impulse responses.

12. The method of claim 1 where the outputting step includes performing a crosstalk cancellation.

13. The method of claim 1 further including outputting a non-audio message in addition to the audio message depending on the driving-relevant information.

14. The method of claim 13 where the non-audio message includes a message chosen from the group consisting of a tactile message and a visual message.

15. A system for conveying information to an occupant of a motor vehicle, comprising:
   sensing mechanisms for obtaining driving-relevant information;
   message selecting mechanism for determining an audio message depending on the driving-relevant information;
   spatial characteristic selecting mechanism for determining the spatial characteristic for outputting the audio message;
   convolution engine for performing a convolution of the audio message with a room impulse response according to the determined spatial characteristic; and
   at least one output device for outputting the audio message in the motor vehicle with the determined spatial characteristic.

16. The system of claim 15 where the sensing mechanism includes at least one element taken from the group consisting of a sensor, a navigation system and an interface.

17. The system of claim 15 further including:
- a memory having a plurality of room impulse responses stored in the memory; and
- where the convolution engine is coupled to the memory.

18. The system of claim 15 where the at least one output device includes at least one pair of loudspeakers.

19. The system of claim 18 where the at least one pair of loudspeakers includes a plurality of pairs of loudspeakers.

20. The system of claim 15 where the at least one output device includes an interface for interfacing with an audio system of the motor vehicle.

21. The system of claim 15 where the at least one output device includes a crosstalk-canceller coupled to the spatial characteristic selecting mechanism to receive a signal from the spatial characteristic selecting mechanism.

22. The system of claim 15 further including a shaker installed in a seat of the motor vehicle, the shaker being activated depending on the obtained driving-relevant information.

23. The apparatus of claim 15 where the obtained driving-relevant information includes at least one message chosen from the group consisting of traffic information, information regarding dangerous driving situations, information regarding other vehicles, information regarding emergency vehicles and information regarding obstacles.

24. The system of claim 15 where the audio message includes at least one message chosen from the group consisting of spoken text, signals, music, traffic sounds and siren sounds.

25. The system of claim 15 where the spatial characteristic includes at least one element from the group consisting of a distance, a direction and a movement.

26. The system of claim 15 where the spatial characteristic corresponds to a position of a relevant element of the driving-relevant information, where the relevant element is stationary and where the spatial characteristic includes movement to decrease the likelihood of front-back confusion.

27. A system for conveying information to an occupant of a motor vehicle, comprising:
- sensing mechanisms for obtaining driving-relevant information;
- message selecting mechanism for determining an audio message depending on the driving-relevant information;
- spatial characteristic selecting mechanism for determining the spatial characteristic for outputting the audio message; and
- at least one output device for outputting the audio message in the motor vehicle with the determined spatial characteristic, where the at least one output device is configured for selecting at least one stored room impulse response depending on the spatial characteristic, and convolving the room impulse response with the audio message.

28. The system of claim 27 where the spatial characteristic includes movement, the at least one room impulse response includes a series of room impulse responses approximating a series of locations of the movement; and the convolving includes sequentially convolving the series of room impulse responses with the audio message.

29. The system of claim 28 where the at least one output device is further configured for fading between adjacent room impulse responses of the series of room impulse responses.

30. A system for conveying information to an occupant of a motor vehicle, comprising:
- at least one sensor;
- a circuit coupled to the sensor configured to determine an audio message and a spatial characteristic for the audio message based on a signal received from the at least one sensor; and
- a sound reproduction system configured to output the audio message with the spatial characteristic, and where the sound reproduction system is configured for selecting at least one stored room impulse response depending on the spatial characteristic, and convolving the room impulse response with the audio message.

* * * * *